Figures 1, 2:
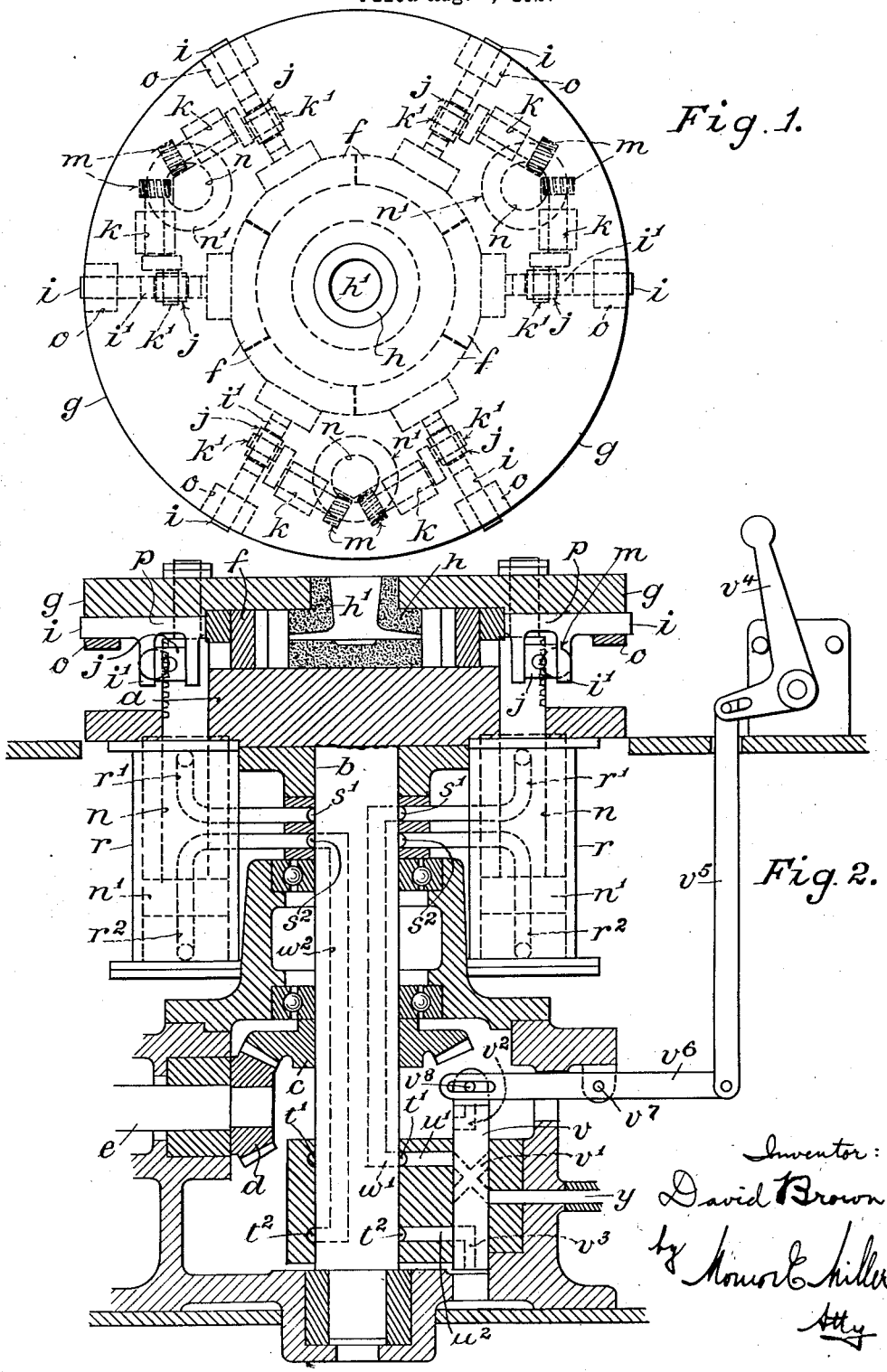

Nov. 13, 1928.

D. BROWN 1,691,464

CENTRIFUGAL MACHINE FOR CASTING METAL

Filed Aug. 4, 1927

Inventor:
David Brown
by Monroe E. Miller
Atty

Patented Nov. 13, 1928.

1,691,464

UNITED STATES PATENT OFFICE.

DAVID BROWN, OF LOCKWOOD, HUDDERSFIELD, ENGLAND, ASSIGNOR TO DAVID BROWN & SONS (HUDDERSFIELD), LIMITED, OF LOCKWOOD, HUDDERSFIELD, ENGLAND, A COMPANY OF GREAT BRITAIN.

CENTRIFUGAL MACHINE FOR CASTING METAL.

Application filed August 4, 1927, Serial No. 210,639, and in Great Britain August 11, 1926.

The invention relates to machine designed for the manufacture of metal castings by the centrifugal process, has for its object the provision of an improved machine which shall enable castings to be made more rapidly and with less labour than is possible with machines heretofore known.

The type of machine to which the invention relates is that in which a mould is arranged to be rotated about a vertical axis the metal being poured into the mould through a central vertical runway coincident with the axis of rotation of the mould.

In machines of this type as at present con15 structed the moulds are placed in position on a mould table by hand, and are located and secured by a cover subsequently bolted down. After the pouring of the metal has been completed, and the casting has solidi20 fied, the cover of the mould is removed and the casting extracted.

A machine according to my invention is characterized in that the mould is made in the form of a plurality of segments which are adapted to be moved radially by suitable means. In one embodiment the top cover for the mould is arranged to have vertical movement, and preferably the mould segments are suitably carried by the top cover so that when the latter is lifted the mould segments will be raised clear of the casting and of any projecting parts of the central core, thus permitting the casting with its core to be withdrawn from the table and the latter to be left free for the production of a new casting.

The means whereby the mould segments and top cover are moved may be purely mechanical, that is to say they may comprise lever, cam, or screw mechanism, or the movements may be effected by a pressure supply or supplies of air or other fluid.

The vertical movement may alternatively be given to the bottom plate if desired, provided that the relative motions of the mould segments to the bottom plate is retained.

In the accompanying drawing, to which reference will now be made,

Fig. 1 is a plan view, and

Fig. 2 a sectional elevation, of the relevant parts of a centrifugal casting machine embodying the invention in one form.

Referring to the drawing, $a$ represents a mould table or bottom plate carried by a vertical spindle $b$, which is adapted to be rotated by bevels $c$ and $d$ and a shaft $e$, from any suitable source. The mould segments, in this instance six in number, are represented at $f$, and rest upon the mould table $a$, the top of the mould being completed by a cover plate $g$. This cover plate has a central opening to receive and position a core $h$, which rests on the mould table and has a pouring gate $h'$.

Each mould segment has on its outerside a radially projecting plunger $i$, and each of these plungers is provided on its underside with projections $i'$ forming between them a gap or vertical slot in which is disposed a block $j$ on an eccentric pin $k'$ on a shaft $k$ journalled in a bearing fast with the cover plate.

The shafts $k$ each carry a toothed pinion $m$, and these pinions mesh with racks formed on vertical spindles $n$. As will be observed, three spindles $n$ serve for the six mould segments, each spindle having two rack surfaces to engage the pinions of two eccentric shafts.

In Fig. 1, the mould segments are shown in inward position, and it will be apparent that on upward movement of the spindles $n$ the shafts $k$ will be rotated and the pins $k'$ carried to the opposite position of throw, thus causing the mould segments to move radially outwards. The outer end of each plunger $i$ is supported in a bearing $o$ fast with the underside of the cover plate $g$.

A suitable gap $p$ is left between the cover plate and a shoulder on each spindle to permit of raising of the cover plate after the segments have been opened out and lowering of it after the segments have been closed in.

To effect the raising and lowering of the cover plate and mould segments, and the opening out and closing of the latter, each spindle $n$ has at its lower end a piston $n'$ working in a cylinder $r$ fast with the mould table $a$. Ducts $r'$ and $r^2$ leading respectively from the upper and lower ends of the cylinder, communicate with respective annular channels $s'$ and $s^2$ surrounding the central driving spindle $b$.

Near the lower end of the spindle $b$, annular channels $t'$ and $t^2$ are provided, from which respective ducts $u'$ and $u^2$ lead to, in this instance, a piston valve $v$ having central cross-over ports $v'$ and upper and lower exhaust ports $v^2$ and $v^3$. Vertical passages $w'$ and $w^2$ in the spindle $b$ connect the annular channels $s'$ and $t'$, and $s^2$ and $t^2$, respectively.

An inlet passage $y$, connected with a suitable compressed air or fluid supply, is adapted to supply air or fluid to either of the ducts $u'$ or $u^2$ according to the vertical position of the valve member $v$. The latter is shown as being under the control of a hand lever $v^4$, through a link $v^5$ and a lever $v^6$ mounted on a fixed pivot at $v^7$ and having a slotted connection at $v^8$ to a pin on the valve member $v$.

In the drawing, the mould is shown as being closed, and pressure medium entering through duct $u'$ and channel $t'$ is acting through passage $w'$, annulus $s'$ and ducts $r'$ upon the upper sides of the pistons $n'$ to hold the cover plate down and the mould segments in position, the undersides of the pistons being open to exhaust through ducts $r^2$, annulus $s^2$, passage $w^2$, annulus $t^2$, duct $u^2$ and exhaust port $v^3$.

If, on completion of a casting operation, the rotation of the spindle $b$ is stopped, and handle $v^4$ thrown over, the valve member $v$ is operated to change over the connection of the pressure medium to duct $u^2$. Thereupon, as will be understood, pressure medium is admitted below the pistons $n'$ and the upper sides of the pistons are connected to exhaust through port $v^2$.

As a result, the spindles $n$ commence to rise, opening out the mould segments and raising the cover plate clear of the mold segments and core, so that the completed casting is left on the mould table free for removal. Obviously, the height to which the mould segments are raised is sufficient to clear the top of the casting and core.

Although I have shown a valve of piston type for controlling the supply of pressure medium, any other suitable form of valve may be substituted.

The internal surfaces of the mould segments and of the cover plate are appropriately fashioned to give the desired shape to the casting, and the base of the mould formed on or carried by the rotating mould table, is also appropriately shaped. The base may, if desired be constituted by a removable chill plate suitably positioned on the table. The segments may be so formed on their inner surfaces as to produce teeth on the periphery of the casting.

Although I have described the mould segments as being moved radially by or through the means employed to raise and lower the cover plate, this is not essential, and it will be apparent that the segments might be moved by means of pistons working in cylinders and acted upon by pressure medium. These pistons for operating the segments may be operated either in unison with, or independently of, those for raising and lowering the cover plate. Further, although we have shown a manual control for the pressure cylinders this may be substituted by any other form of control, and such control means may be interconnected with the means for controlling rotation of the mould. Although I have shown and described an embodiment in which a pressure medium is used to move the mould segments and cover plate, any suitable mechanical operating means may be substituted.

It will also be apparent that instead of the mould segments having radial sliding movements as shown, they may be mounted pivotally.

Both the cover plate, mould segments, and base plate may, if desired, be hollow to permit of the circulation of a cooling medium through them.

The details of construction and arrangement of the parts employed in carrying out the invention may be varied from the particular embodiment described and illustrated in many ways other than those specifically mentioned.

Having thus described my invention, what I claim as new and desire to secure by Letters Patent is:—

1. A centrifugal casting machine embodying a rotary mold having a periphery composed of radially movable segments.

2. A centrifugal casting machine embodying a rotary mold having a periphery composed of radially movable segments, and means for moving said segments radially to and away from one another.

3. A centrifugal casting machine including a rotary mold comprising plates one of which is movable toward and away from the other plate, and radially movable segments between said plates.

4. A centrifugal casting machine including a rotary mold comprising plates one of which is movable toward and away from the other plate, radially movable segments between said plates, and means for moving said movable plate toward and away from the other plate and for moving said segments radially to close and open the mold.

5. A centrifugal casting machine comprising a rotary mold having spaced plates one of which is movable toward and away from the other plate, and radially movable segments between said plates carried by one plate.

6. A centrifugal casting machine comprising a rotary mold having spaced plates one of which is movable toward and away from the other plate, said mold including segments between said plates movable radially, means for moving said movable plate toward and away from the other plate, and means operable by the movement of said movable plate toward and away from the other plate for moving said segments inwardly and outwardly to close and open the mold, respectively.

7. A centrifugal casting machine including a rotary mold having spaced plates one of which is movable toward and away from the other plate, and including radially movable segments between the plates carried by one plate, means for moving said movable plate toward and away from the other plate, and means operable by the movement of said movable plate toward and away from the other plate for moving said segments inwardly and outwardly respectively.

8. A centrifugal casting machine comprising a rotary mold having a bottom plate, a vertically movable top plate and radially movable segments between said plates carried by the top plate, means for raising and lowering the top plate, and means controlled by said means for moving said segments outwardly and inwardly when the top plate is raised and lowered, respectively.

In testimony whereof I affix my signature.

DAVID BROWN.